United States Patent [19]

Fulton

[11] Patent Number: 5,604,768
[45] Date of Patent: Feb. 18, 1997

[54] FREQUENCY SYNCHRONIZED BIDIRECTIONAL RADIO SYSTEM

[75] Inventor: Forrest F. Fulton, Los Altos, Calif.

[73] Assignee: CellNet Data Systems, Inc., San Carlos, Calif.

[21] Appl. No.: 361,799

[22] Filed: Dec. 21, 1994

Related U.S. Application Data

[63] Continuation-in-part of Ser. No. 818,693, Jan. 9, 1992, Pat. No. 5,377,232.

[51] Int. Cl.[6] .................................. H04B 1/38; H04L 5/16
[52] U.S. Cl. .......................... 375/220; 375/221; 375/317; 375/326; 375/356; 370/350; 455/76
[58] Field of Search ........................ 375/219, 220, 375/221, 317, 358, 324, 326, 356; 455/51.1, 75, 76, 88; 327/50, 73, 77; 370/85.8, 95.2, 100.1

[56] References Cited

U.S. PATENT DOCUMENTS

| | | | |
|---|---|---|---|
| 2,757,279 | 7/1956 | Vosburgh | 250/6 |
| 3,931,575 | 1/1976 | Amoroso, Jr. | 325/17 |
| 4,451,930 | 5/1984 | Chapman et al. | 455/260 |
| 4,489,413 | 12/1984 | Richmond et al. | 370/30 |
| 4,513,447 | 4/1985 | Carson | 455/76 |
| 4,532,635 | 7/1985 | Mangulis | 375/1 |
| 4,587,661 | 5/1986 | Schiff | 375/1 |
| 4,590,602 | 5/1986 | Wolaver | 375/120 |
| 4,631,738 | 12/1986 | Betts et al. | 375/98 |
| 4,651,330 | 3/1987 | Ballance | 375/108 |
| 4,703,520 | 10/1987 | Rozanski, Jr. et al. | 455/75 |
| 4,727,333 | 2/1988 | Dieterich | 329/50 |
| 4,993,048 | 2/1991 | Williams et al. | 375/97 |
| 5,003,559 | 3/1991 | Kanai et al. | 375/109 |
| 5,187,719 | 2/1993 | Birgenheier et al. | 375/10 |
| 5,216,717 | 6/1993 | Bourcet et al. | 381/3 |
| 5,260,974 | 11/1993 | Johnson et al. | 375/317 |
| 5,367,535 | 11/1994 | Scholz | 375/317 |
| 5,377,232 | 12/1994 | Davidov et al. | 375/354 |
| 5,469,762 | 10/1995 | Wang et al. | 375/317 |

Primary Examiner—Stephen Chin
Assistant Examiner—Don Vo
Attorney, Agent, or Firm—Fish & Richardson P.C.

[57] ABSTRACT

A bidirectional radio system for low-cost high-throughput accumulation of data from a large number of site units. Frequency synchronization is achieved at low cost by transmitting a high accuracy carrier and clock signal at a base station, and using receiving circuitry at remote stations to extract the base clock signal and base carrier frequency and a phase-lock loop to stabilize the remote station carriers. A burst demodulator at a base station receiver can decode a short remote station response by scaling the response with the phase and amplitude of an initial segment of the response. The burst demodulator may continuously update the decoding threshold based on a comparison of the signal amplitude and the current value of the decoding threshold. In an alternate embodiment, the carrier synthesizer is not part of a phase-lock loop, but the transmitted signal is rotated by a phase proportional to a frequency error to provide an accurate carrier frequency. In yet another alternate embodiment only a frequency-control loop is implemented, and again the transmitted signal is rotated by a phase ramp proportional to a frequency error to provide an accurate carrier frequency. In this embodiment separate rotators may be used on both the transmission and reception sides of the circuit, or a single rotator may be switched between the transmission and reception sides of the circuit for half-duplex operation.

8 Claims, 10 Drawing Sheets

FREQUENCY SYNCHRONIZED BIDIRECTIONAL RADIO SYSTEM

CROSS-REFERENCE TO RELATED APPLICATIONS

This application is a continuation-in-part of patent application Ser. No. 07/818,693, now. U.S. Pat. No. 5,377,232, filed Jan. 9, 1992, entitled FREQUENCY SYNCHRONIZED BIDIRECTIONAL RADIO SYSTEM.

BACKGROUND OF THE INVENTION

The present invention relates generally to bidirectional radio communication systems, and more particularly to bidirectional radio communication systems wherein one transceiver transmits frequency reference information to other transceivers, the radio communication system providing load control or utility use monitoring.

In a typical two-way radio communication system, a base station operating on one frequency transmits to a remote station, and the remote station transmits back to the base station on a related frequency. The relationship between the transmission frequencies of the base and remote stations is determined by the licensing rules of the Federal Communications Commission (FCC). For instance, in the Multiple Address System band the base station and remote frequencies are separated by 24 megahertz (MHz).

A dual carrier radio communication system becomes problematic when high through-put communications are required with a large number of stations spread over a large geographic area. One base station transmitter in communication with a number of remote stations will have a through-put determined by the bandwidth efficiency, as measured in bits per second per Hertz. High bandwidth efficiency transceivers are prohibitively expensive in systems which require many remote transceivers. In addition, if one powerful base station is transmitting over a large area there will be regions with poor reception, i.e. dead spots, due to geographic irregularities.

Alternatively, through-put may be increased by transmission of a plurality of carriers within an FCC approved band. This is termed frequency division multiplexing. The cost of this approach is usually in the increased frequency accuracy required of the radio transmitters. Frequency division multiplexing offers the additional advantage that the frequencies can be spatially reused; transmission regions (cells) which utilize the same pair of carrier frequencies are separated by cells which utilize different pairs of carrier frequencies, thereby minimizing interference. The through-put of such systems is equal to the product of the bandwidth efficiency, the number of cells in the system and the bandwidth of the carriers.

Accurate frequency control is conventionally accomplished by using quartz crystal resonators. With careful manufacturing techniques and control of temperature effects, an accuracy of a few parts-per-million is obtainable. Another standard frequency control technique utilizes feedback circuitry. For instance, a transceiver in conjunction with another transceiver with an accurate carrier can generate highly accurate signals utilizing two oscillators. First the signal is heterodyned to an intermediate frequency, then an accurate local oscillator at the intermediate frequency heterodynes the intermediate frequency signal to baseband, where the frequency and phase error of the intermediate frequency can be measured. This error is fed back to the first oscillator to correct its frequency.

With present technology, reduced frequency spacings can only be accomplished by using an outside source for a high stability frequency reference, such as WWV, GPS, or LOGAN. The additional cost of including this refined capability in every radio within a system is prohibitive for many applications where low cost of two-way radio communication can bring substantial economic benefits.

An object of the present invention is to provide a high through-put bidirectional radio communications system between at least one base station and a large number of remote stations.

More particularly, an object of the present invention is to provide a low-cost method of generating radio signals at remote stations with a frequency accuracy necessary to provide frequency division multiplexing.

Another object of the present invention is to provide a low-cost method of generating a high accuracy transmission carrier at a remote station utilizing both information contained in the received carrier and information in the modulation of the carrier, particularly the clock rate of the signal.

Another object of the present invention is to provide a radio communications system wherein high data through-put is achieved at low cost by frequency synchronization, frequency division multiplexing, and time division multiplexing.

Another object of the present invention is to provide a receiver for decoding short data bursts from a plurality of transmitters.

Another object of the present invention is to provide a short burst data demodulator with an adaptive decoding threshold.

Another object of the present invention is to provide a transceiver with an accurate transmission frequency which does not utilize an analog phase-lock oscillator loop.

Another object of the present invention is to provide a radio system with an accurate transmission frequency which only utilizes a frequency-control loop.

Another object of the present invention is to provide a radio system with an accurate transmission frequency which utilizes a frequency-control loop circuit and shares a rotator between the transmission and reception sides of the circuit.

Another object of the present invention is to simplify the circuitry of a receiver with clock rate and carrier frequency recovery.

More particularly, an object of this invention is to simplify the circuitry of a receiver with clock rate and carrier frequency recovery by providing a reception circuit which is coupled to the transmission circuit to produce transmission carrier stabilization, by providing independent clock rate and carrier frequency recovery from the received signal, and to provide a phase-lock loop at the baseband rather than the intermediate frequency level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a bidirectional communications systems wherein a base station transceiver transmits signals with a highly precise clock rate over a highly precise carrier frequency, and a remote station transceiver receives the base station signals and extracts the clock rate and carrier frequency information from the received signals. The remote station utilizes the extracted information to stabilize the frequency of the remote station carrier.

The radio system of the present invention provides a high through put bidirectional communications link between a large number, possibly thousands, of remote information gathering stations and a plurality of base stations. The system maximizes data throughput by transmitting over a plurality of carrier frequencies (frequency division multiplexing) within, for example, a 12.5 kilohertz (kHz) FCC bandwidth. The communications region is divided into cells, with one base station per cell and neighboring cells utilizing different carrier frequencies. Each base station transmits a continuous stream of polling signals. The polling signals direct the remote stations within the cell to respond with various types of information. The remote station transmissions are time division multiplexed, i.e. the timing of remote station responses are specified by the polling signals received by the remote stations. The base station is adapted to decode very short bursts of response data transmitted from remote stations.

The present invention produces the frequency accuracy required for frequency division multiplexing while mainly incurring the cost for the improved accuracy at the base stations. This is accomplished by using the combination of the base station carrier frequency and a frequency included in the modulation from the base station, namely the clock rate of the digital signal, to accurately generate the remote station transmitter frequency from the base station transmitter signal.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE PREFERRED EMBODIMENT

Overview

Figure 1:
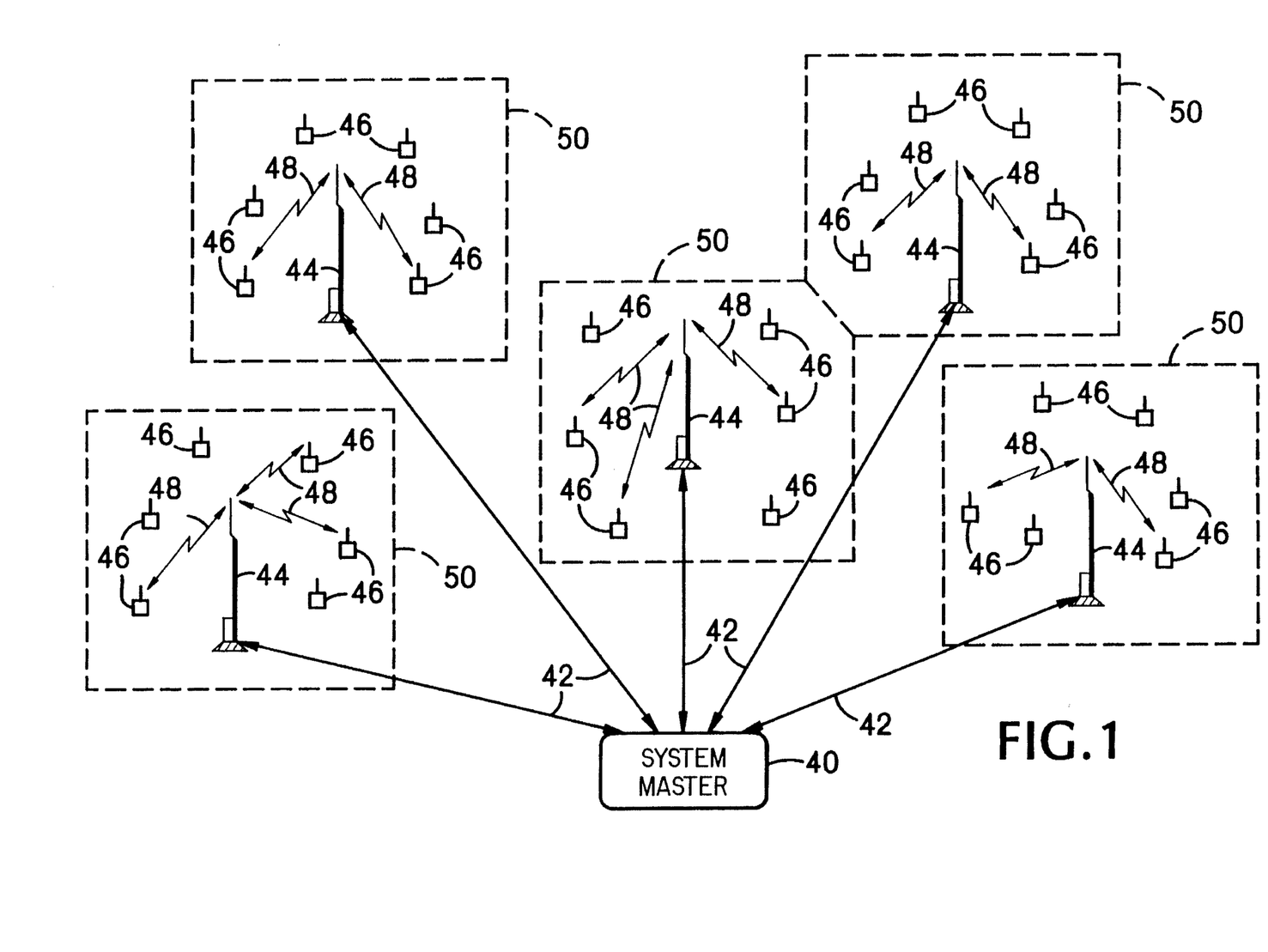
FIG. 1 is an exemplary schematic geographical depiction of the communication system of the present invention.

The present invention will be described in terms of the preferred embodiment. The preferred embodiment is an apparatus and method for frequency synchronized bidirectional radio communications. A schematic geographical depiction of the two-way radio system of the present invention is depicted in FIG. 1. The system master 40 is the central control system and information processor. The system master 40 may communicate by telephone lines 42 with a number of base stations 44, collecting information acquired by the base stations 44 and sending polling directions to the base stations 44. The polling directions specify which types of information are to be collected and when. These base stations transmit a continuous radio frequency signal 48 to a number of remote stations 46 in accordance with the polling directions received from the system master 40. The remote stations 46 are possibly extremely densely geographically located. Each remote station 46 communicates with one or more site units (not shown). Site units may, for instance, monitor electrical power consumption of homes, the status of burglar alarms, or control the functions of electrical appliances within homes. Each base station 44, and the group of remote stations 46 with which that base station 44 communicates, comprises a cell 50. The remote stations 46 transmit the information they have collected in short radio communication 'bursts' to the base station 44 within the cell 50 at times specified by the base station 44.

Base station 44/remote station 46 communications consist of two modes. In the fast polling mode, base station transmissions 48 direct remote stations 44 within the cell 50 to inform the base station 44 by radio communication if they have information ready to be transmitted. Once the base station 44 has determined which remote stations 46 have data to be transmitted, the base station transmissions 48 direct those remote stations 46 with information to respond. Each transmission from a base station 44 specifies which remote stations 46 are addressed, what type of information the addressed remote stations 46 are to transmit, how long the addressed remote stations 46 are to wait before transmitting, and how long the remote station 46 response is to be.

The format of the base station 44/remote station 46 communications is described in U.S. Pat. No. 4,972,507, issued Nov. 20, 1990, which is incorporated herein by reference.

To minimize radio interference between cells 50, the base 44 and remote 46 stations of neighboring cells 50 transmit at different frequencies. The larger the number of transmission frequencies utilized in the system, the larger the spacing between cells utilizing the same frequency, and the less the interference between cells.

Figure 2:
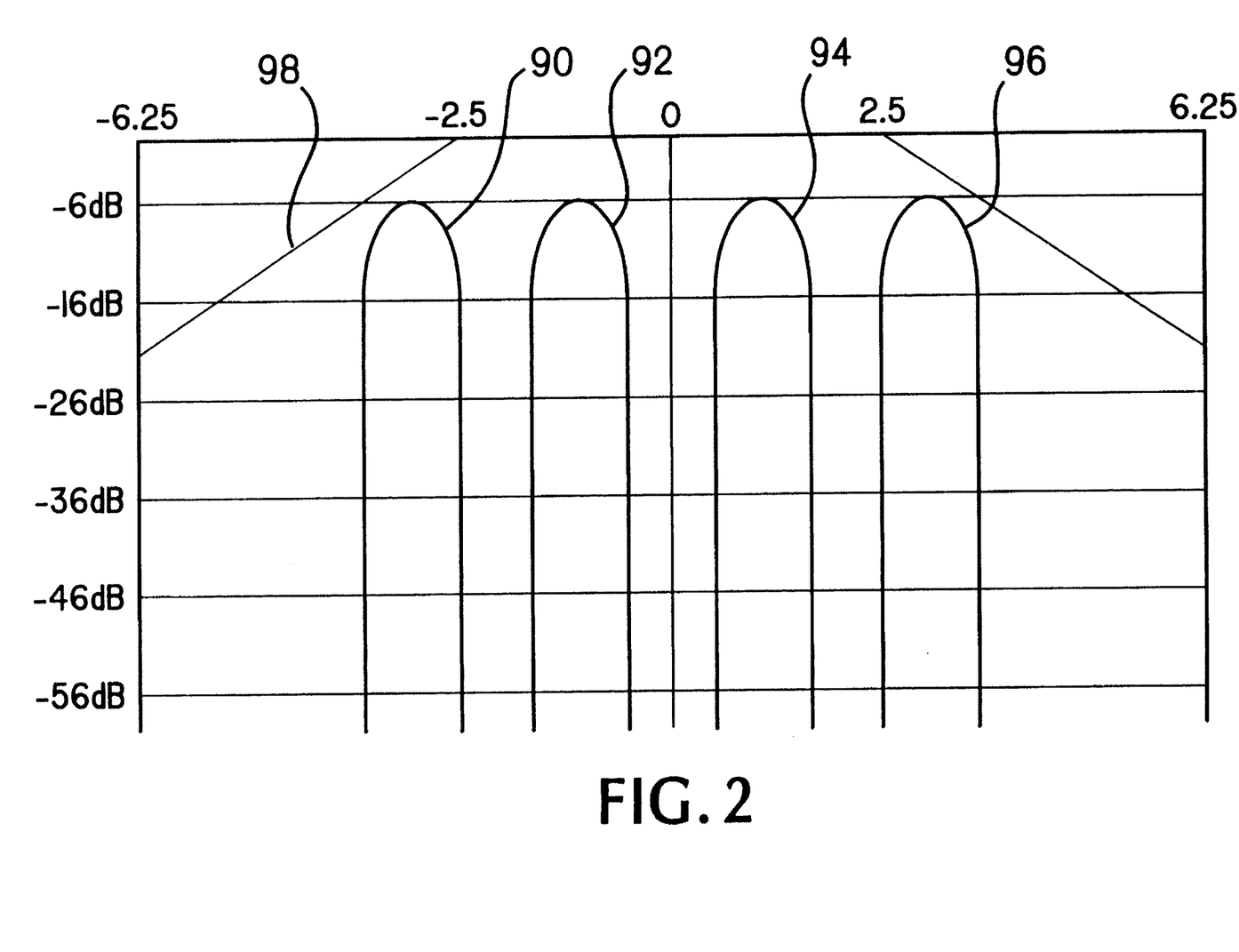
FIG. 2 is a frequency versus power plot of the power spectrum of four carrier frequencies within the 12.5 kHz power spectrum approved by the FCC for radio transmissions.

Because the present invention provides frequency accuracy and stability of the remote station carriers at low cost, the communication system of the present invention utilizes a multiplicity of carrier frequencies which are more closely spaced than those conventionally used. For instance, as shown in FIG. 2, the present embodiment utilizes four carriers 90, 92, 94 and 96 within a 12.5 kHz bandwidth conventionally reserved by the FCC for one carrier. It should be understood that the width of the FCC band and the number of carriers per band can vary, and the 12.5 kHz bandwidth and four carriers discussed herein are only exemplary.

Carriers 92 and 94 are offset by +/− 1041.67 Hz, and carriers 90 and 96 are offset by +/− 3125 Hz from the central frequency, and the peak power of each carrier lies 6 decibels (dB) below the permitted maximum (0 dB). As is well known in the art, 9QPR coding of a signal provides a bandwidth efficiency of 2 bits per second per Hertz. In 9QPR encoding data is encoded on both the sine and cosine (or in-phase and quadrature) components of a carrier. See *Digital Transmission Systems*, by David R. Smith, Van Nostrand Reinhold Co., New York, N.Y., 1985, section 6.4, pages 251–254, which describes 9QPR encoding in detail, and is incorporated by reference herein. The frequency spacing of about 2083 Hz between carriers 90, 92, 94, and 96 permits transmission of 2400 bits per second (bps) on each carrier, with guard bands of almost 1000 Hz between bands. The envelope 98 which extends between the points (−6.25 kHz, −10 dB), (−2.5 kHz, 0 dB), (2.5 kHz, 0 dB), and (6.25 kHz, −10 dB) describes the power distribution permitted by the FCC for radio signals within a 12.5 kHz bandwidth. Clearly, the sum of the power distribution of these four carriers 90, 92, 94 and 96 falls within the bounds of FCC guidelines.

Base Transceiver circuitry

Figure 3:
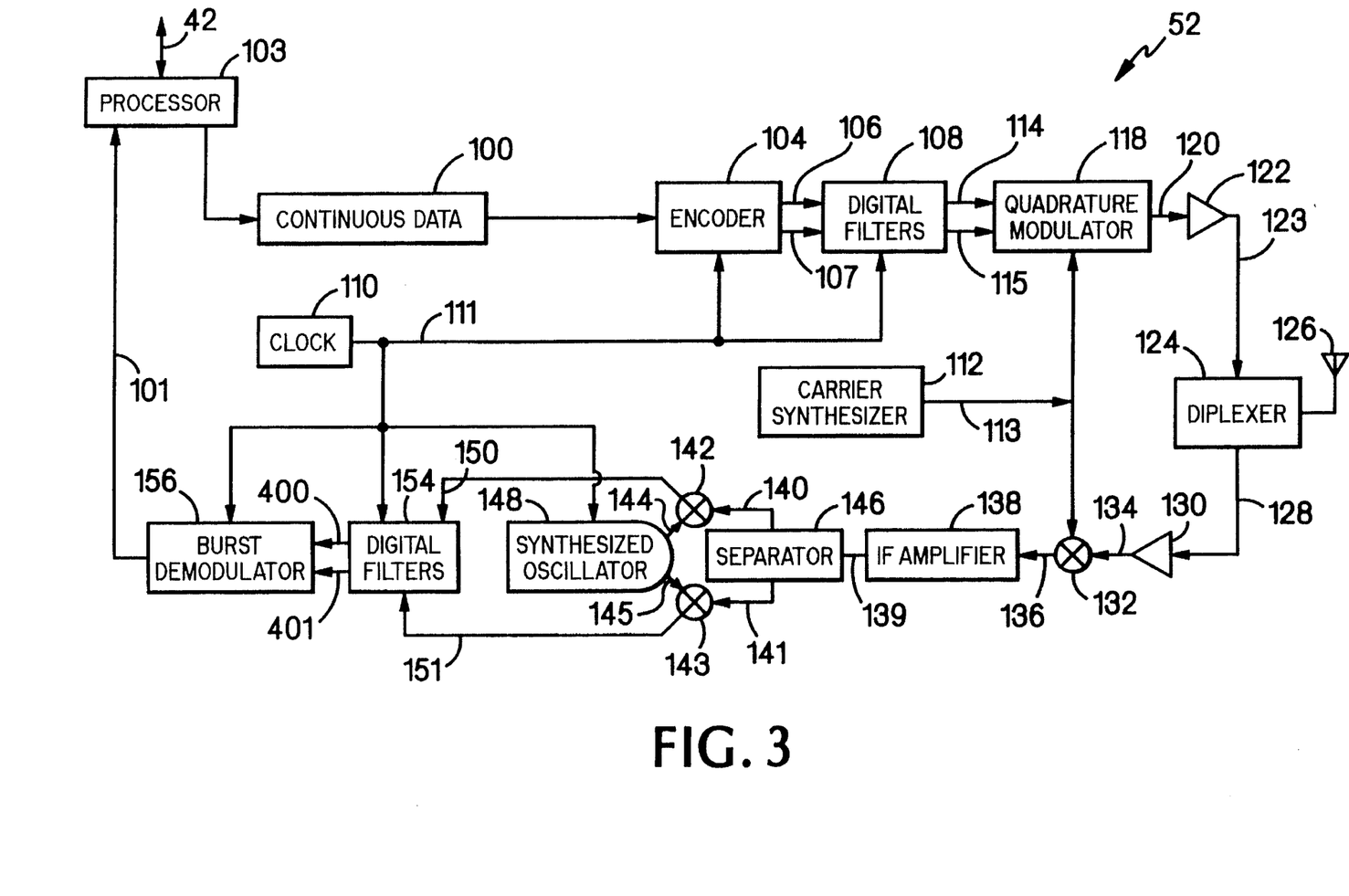
FIG. 3 is a schematic block diagram of the base transceiver circuitry of the present invention.

An embodiment of a base station transceiver 52 of the present invention is shown in FIG. 3. The base station transceiver 52 communicates by radio with the remote station transceivers 46 within the cell 50, and by phone line 42 with the system master 40. The processor 103 of transceiver 52 processes information 101 received from the remote stations 46, as will be described below, and sends it by telephone line 42 to the system master 40. The processor 103 also receives polling directions from the system master 40 by telephone line 42 and translates these directions into a continuous digital data stream 100 which will be transmitted to the remote stations 46, also as described below.

The continuous stream of digital data 100 is sent to an encoder 104 which performs differential encoding on the bit stream to prevent error propagation in the data stream. The even and odd bits of the data stream 100 are separated into two separate data streams 106 and 107 and sent to the digital filters 108. The digital filters 108 perform pulse shaping to reduce the spectral width of the transmitted signal, thereby increasing the bandwidth efficiency of filtered signals 114 and 115. The clock 110 generates a highly precise clock signal 111 which sets the rate of the data flow through the encoder 104 and digital filters 108 at a total of 2400 bps, i.e. 1200 bps for the even and odd bit streams.

The base station 44 has a carrier frequency synthesizer 112 which produces a sinusoidal carrier signal 113 of, for example, 952 MHz from a highly accurate reference frequency source. Present technology allows the generation of a carrier signal 113 with a frequency stability of one part in $10^9$ per day and an accuracy of about five parts in $10^9$. Filtered signals 114 and 115 are sent from the digital filters 108 to a quadrature modulator 118 where the 1200 bps signal 114 is modulated onto the sine component of the carrier signal 113, and the 1200 bps signal 115 is modulated onto the cosine component of the carrier signal 113 to produce a 9QPR modulated signal 120 with a bandwidth efficiency of 2 bps per Hertz. The signal 120 is amplified by the transmission amplifier 122 and the amplified signal 123 is sent to a diplexer 124. The diplexer channels outgoing signals 123 to the antenna 126 for transmission to the remote stations 46, and channels incoming radio communications from the antenna 126, i.e. from the remote stations, to diplexer output 128.

In accordance with FCC specifications for the radio spectrum, multiple access systems are relegated to frequencies near 952 MHz, and transmission/reception frequency pairs are separated by 24 MHz. Incoming signals to the base transceiver 52 at, for instance, 928 MHz are received by the antenna 126, and channeled by the diplexer 124 to diplexer output 128. The diplexer output 128 is amplified by the reception amplifier 130, and sent to a superheterodyning mixer 132. There the signal 134 is heterodyned with the carrier signal 113 generated by the carrier synthesizer 112 to produce an intermediate frequency signal 136 on a 24 MHz carrier.

The 24 MHz signal 136 undergoes selective gain filtering at an intermediate frequency (IF) amplifier 138, and the sine and cosine components 140 and 141 of the IF amplifier output 139 are separated by the separator 146 and heterodyned by heterodynes 142 and 143 with in-phase and quadrature 24 MHz signals 144 and 145 generated by the synthesized oscillator 148. The 24 MHz signals 144 and 145 are generated from the clock signal 111 by the synthesized oscillator 148 which increases the clock frequency by a factor of $2\times10^4$. Heterodynes 142 and 143 output baseband signals 150 and 151. Analog baseband signals 150 and 151 are then converted to digital form and digitally filtered by digital filters 154 and sent to a burst demodulator 156.

The burst demodulator 156 is designed to provide decoding of short bursts of data. In this preferred embodiment the demodulator 158 can handle data transmissions as short as 6 bits (3 symbols) in length. To permit such rapid decoding without a loss of information the first symbol sent by a remote station 46 to the transceiver 52 is a reference symbol of known amplitude and phase.

Figure 6:
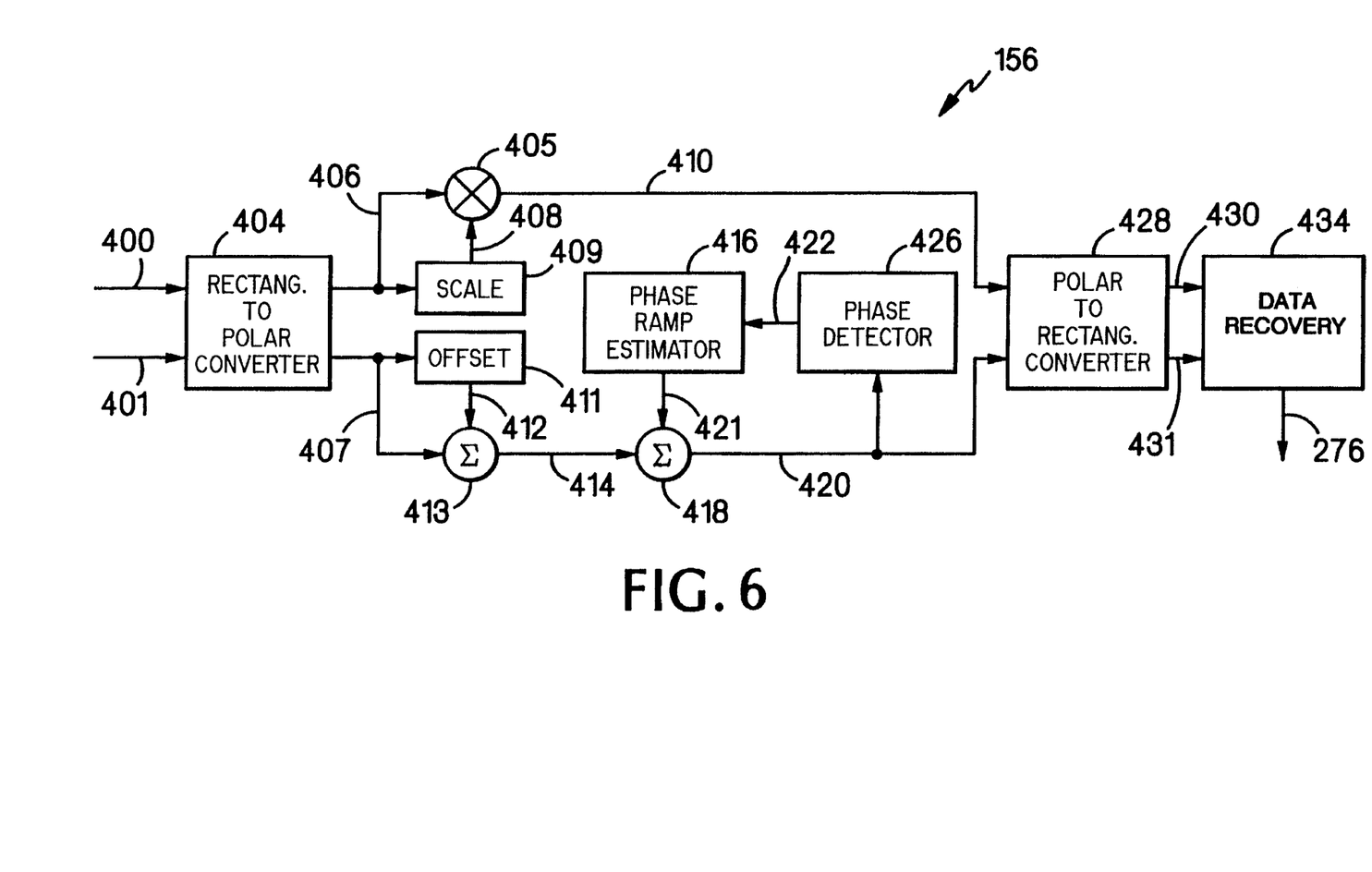
FIG. 6 is a schematic block diagram of the burst data demodulation circuitry of the base transceiver.

The burst demodulator 156 is depicted in greater detail in FIG. 6. The burst demodulator 156 allows for errorless decoding of short data pulses by scaling the phase and amplitude of the signal by the phase and amplitude of an initial reference signal. Quadrature encoded baseband signals 400 and 401 are converted from quadrature (or rectangular) form to polar form at a rectangular to polar converter 404. In polar form the signal has an amplitude component 406 and a phase component 407. During a reference symbol time interval the amplitude and phase of the first symbol are latched by the scale monitor 409 and the offset monitor 411. The amplitude of the first symbol 408 is then sent to the multiplier 405 to scale all subsequent amplitude symbols 406 in the burst. Similarly, the phase of the first symbol 412 is sent to the summing circuit 413 to scale the phase of all subsequent symbols 407 in the burst. This assures that random phases of baseband signals 400 and 401 are compensated for and the data decoding thresholds are properly aligned in scaled outputs 410 and 414.

Since different remote radio 46 carrier frequencies can vary by small amounts, a frequency error compensator in the burst demodulator 156 is also needed. This is implemented by a phase detector 426 which determines the phase of signal 420 and sends a phase information signal 422 to a phase ramp estimator 416. The phase ramp estimator 416 generates a ramp voltage 421 which linearly increases in amplitude with time at a rate proportional to the frequency error superimposed on the baseband signals 400 and 401. The summing circuit 418 sums the phase signal 414 and voltage 421 to scale the phase, thus effectively correcting for any frequency error in output 420. The amplitude and phase signal 410 and 420 are reconverted to rectangular signals 430 and 431 at the polar to rectangular converter 428. Data recovery can then be performed at the data recovery circuit 434 and recovered data 276 is sent to processor 203.

Figure 7:
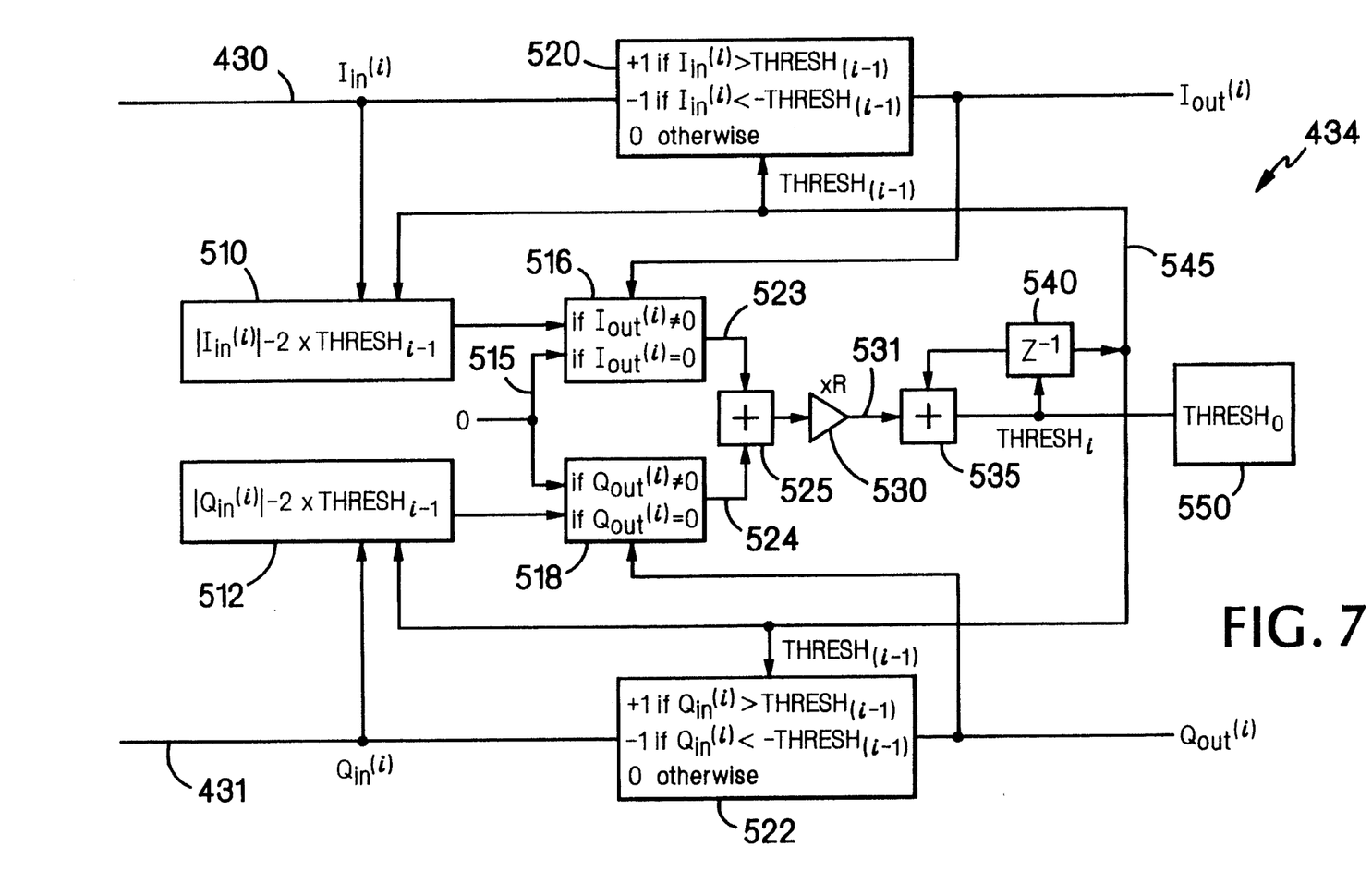
FIG. 7 is a schematic block diagram of a burst demodulator with an adaptive threshold value.

A preferred embodiment of the data recovery circuit 434 of FIG. 6 is shown in detail in FIG. 7. This data recovery circuit 434 provides additional means for compensating for a change in amplitude of the received packet, since the propagation path will sometimes be such that the initial scale factor determined by the scale monitor 409 will not be accurate by the end of the burst. The data recovery circuit 434 evaluates the incoming analog signals 430 and 431 to determine their digital values by comparing the values of the analog signals 430 and 431 with decoding thresholds. For 9QPR modulation the symbol values are nominally +1, 0 and −1, and the decoding thresholds should be at +0.5 and −0.5. If a signal has a value between +0.5 and −0.5 it is interpreted as a 0, if a signal has a value greater than +0.5 it is interpreted as a 1, and if a signal has a value less than −0.5 it is interpreted as a −1. However, if the received signal has an unexpected loss of amplitude, then nonzero values are likely to be incorrectly interpreted as having a value of 0. Inaccurate scaling by the scale monitor 409 can therefore cause errors in the data recovery because the decoding thresholds are no longer appropriate.

The data recovery circuit 434 of FIG. 7 therefore adaptively adjusts the threshold values according to the amplitude of each bit of the received signal. The threshold is initialized at a value $THRESH_0$ for the first bit of the packet, and the scale monitor 409 scales the first part of the signal so that $THRESH_0$ is halfway between the values for a +1 and a 0 bit. As the packet continues, and possibly changes amplitude due to fading, the I and Q sample values possibly change, and the THRESH value is updated by the following procedure. The $i^{th}$ digital values $I_{out}^{(i)}$ and $Q_{out}^{(i)}$ are determined from the $i^{th}$ analog input values $I_{in}^{(i)}$ and $Q_{in}^{(i)}$ of the in-phase and quadrature signal components by the in-phase and quadrature decoders 520 and 522, respectively, using the $(i-1)^{th}$ threshold value $THRESH_{i-1}$ provided on line 545. If the $i^{th}$ in-phase signal $I_{in}^{(i)}$ has a value greater than the $(i-1)^{th}$ threshold value $THRESH_{i-1}$ the in-phase decoder 520 interprets $I_{in}^{(i)}$ as a +1 (i.e., it provides an $I_{out}^{(i)}$ value of +1), if the $i^{th}$ in-phase signal $I_{in}^{(i)}$ has a value less than the negative of the $(i-1)^{th}$ threshold value $(-1 \times THRESH_{i-1})$ the in-phase decoder 520 interprets $I_{in}^{(i)}$ as a −1, and if the $i^{th}$ in-phase signal $I_{in}^{(i)}$ has a value greater than the negative of the $(i-1)^{th}$ threshold value $(-1 \times THRESH_{i-1})$ and less than the $(i-1)^{th}$ threshold value $THRESH_{i-1}$ the in-phase decoder 520 interprets $I_{in}^{(i)}$ as a 0. Similarly, if the $i^{th}$ quadrature signal $Q_{in}^{(i)}$ has a value greater than the $(i-1)^{th}$ threshold value $THRESH_{i-1}$ the quadrature decoder 522 interprets $Q_{in}^{(i)}$ as a +1, if the quadrature signal $Q_{in}^{(i)}$ has a value less than the negative of the threshold value $(-1 \times THRESH_{i-1})$ the quadrature decoder 522 interprets $Q_{in}^{(i)}$ as a −1, and if the quadrature signal $Q_{in}^{(i)}$ has a value greater than the negative of the threshold value $(-1 \times THRESH_{i-1})$ and less than the threshold value $THRESH_{i-1}$ the quadrature decoder 522 interprets $Q_{in}^{(i)}$ as a 0.

For each bit of the signal, twice the $(i-1)^{th}$ threshold value $THRESH_{i-1}$ from line 545 is subtracted from the absolute values of the $i^{th}$ in-phase and quadrature components $I_{in}^{(i)}$ and $Q_{in}^{(i)}$ on lines 430 and 431 at in-phase and quadrature comparison units 510 and 512, respectively. The outputs from the in-phase and quadrature comparison units 510 and 512 are directed to in-phase and quadrature switches 516 and 518. Also directed to the in-phase and quadrature switches 516 and 518 is a zero value on line 515. Which of the inputs to the switches 516 and 518 is chosen is dependent on the $i^{th}$ in-phase and quadrature output values $I_{out}^{(i)}$ and $Q_{out}^{(i)}$. If $I_{out}^{(i)}$ has a value of zero the zero input on line 515 is output on line 523 from the in-phase switch 516. However, if $I_{out}^{(i)}$ does not have a value of zero, then the output from the in-phase comparison unit 510 is output from the in-phase switch 516. Similarly, if $Q_{out}^{(i)}$ has a value of zero the zero input on line 515 is output on line 524 from the quadrature switch 518, and if $Q_{out}^{(i)}$ does not have a value of zero, then the output from the quadrature comparison unit 512 is output from the in-phase switch 518. The outputs on lines 523 and 524 are summed at a summer 525, and the sum is multiplied by a reduction factor R at a multiplier 530 to produce a reduced sum on line 531. In the preferred embodiment the reduction factor R has a value of $\frac{1}{32}$. The reduced sum on line 531 is then added to the $(i-1)^{th}$ value of the threshold $THRESH_{i-1}$ at a second summer 535, the $(i-1)^{th}$ value of threshold being stored by the delay unit 540. Mathematically, the $i^{th}$ value of the threshold, $THRESH_i$, is given by $$THRESH_i =$$

$$THRESH_{i-1} + R * |I_{out}^{(i)}| * \{|I_{in}^{(i)}| - 2*THRESH_{i-1}\} +$$

$$R * |Q_{out}^{(i)}| * \{|Q_{in}^{(i)}| - 2*THRESH_{i-1}\},$$

where R is the multiplication factor at the multiplier unit 530.

Remote Transceiver Circuitry

Figure 4:
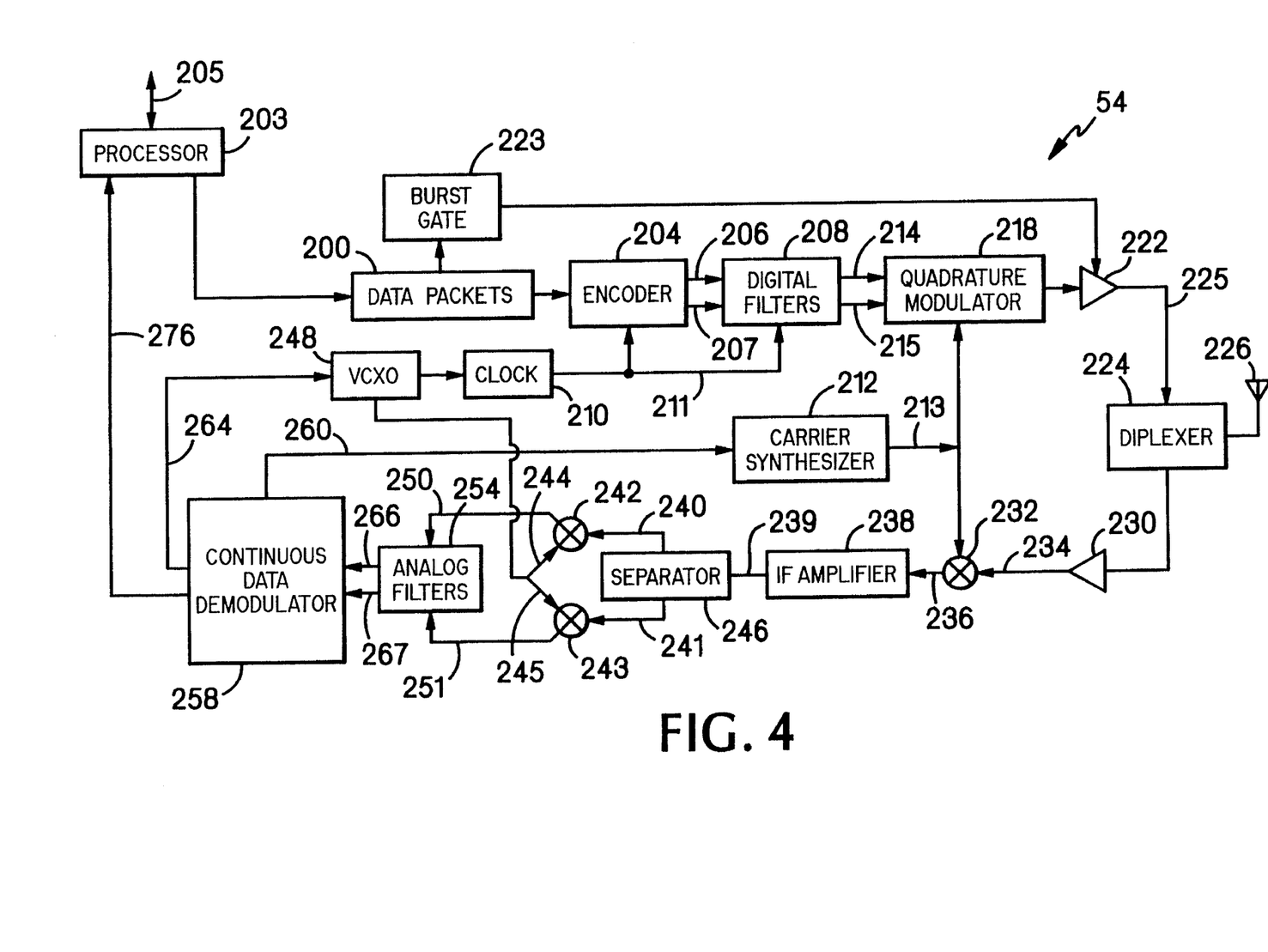
FIG. 4 is a schematic block diagram of the remote transceiver circuitry of the present invention.

The remote transceiver 54 diagrammed in FIG. 4 relays data 205 acquired at site units (not shown) to a base station 44 by radio transmissions. The receiver 54 receives data 205 from site units and processes the information to form data packets 200 from the continuous stream of directions 276 transmitted by a base station 44, as described below. Data packets 200 are first sent to an encoder 204. As in the encoder 104 of the base station transceiver 52, this encoder 204 separates the data packets 200 into odd and even bits and performs differential encoding on the data streams. The resulting even and odd data streams 206 and 207, respectively, are sent through digital filters 208 to shape the spectrum of the signals. A clock signal 211 from clock 210 controls the rate of processing of encoder 204 and digital filters 208.

The even and odd data streams 214 and 215 from the digital filters 208 are then modulated by a quadrature modulator 218 to produce a 9QPR signal on carrier 213 generated by a carrier synthesizer 212. Through the feedback mechanism described below, the synthesizer 212 has a precisely controlled frequency of, in this case, 928 MHz. A transmitting amplifier 222 is activated by a burst gate 223 when the remote station 46 is transmitting data to a base station 44. The amplified signal 225 from amplifier 222 is directed through a diplexer 224 to an antenna 226 for transmission to base station 44.

Incoming signals from base station 44 are received by antenna 226, and channeled by the diplexer 224 to a reception amplifier 230 and heterodyned at a superheterodyning mixer 232 with the locally generated carrier 213 to convert the incoming signal 234 to an intermediate frequency signal 236. Given that the reception frequency is 952 MHz and assuming the carrier 213 output from the synthesizer 212 is exactly 928 MHz, the carrier of the intermediate frequency signal 236 is at 24 MHz. But any error in the output 213 of the synthesizer 212 causes a deviation in the frequency of the intermediate frequency signal 236 from 24 MHz.

The intermediate frequency signal 236 is then amplified further by an intermediate frequency (IF) amplifier 238. In-phase and quadrature components 240 and 241 are separated from the amplified intermediate frequency signal 239 by the separator 246, and are heterodyned by mixers 242 and 243 with in-phase and quadrature 24 MHz signals 244 and 245 generated by a voltage controlled crystal oscillator (VCXO) 248 to produce baseband signals 250 and 251. The signals 250 and 251 are then directed to the analog filters 254 which process the signals 250 and 251 to provide better band pulse shaping and out-of-band signal rejection to produced filtered baseband signals 266 and 267. Data recovery from the filtered baseband signals 266 and 267 is performed by the continuous data demodulator 258.

Ideally, the intermediate frequency signal 236 is modulated on a carrier of exactly 24 MHz and the VCXO 248 generates sinusoids 244 and 245 at exactly 24 MHz, and therefore the baseband signals 250 and 251 have a zero frequency carrier. The frequency and phase of the baseband signals 250 and 251, and thereby the frequency and phase errors of the carrier synthesizer 212 or VCXO 248, are measured by the continuous data demodulator 258 using either conventional digital radio receiver techniques, or the carrier recovery technique described below. Frequency error signal 260 may be fed back to the carrier synthesizer 212 to correct its frequency so as to minimize the aforementioned error, thereby effecting a phase-locked loop circuit.

For high accuracy of the carrier 213 from carrier synthesizer 212, it is necessary that the signals 244 and 245 from the VCXO 248 also be accurate, because any error in the outputs 244 and 245 from the VCXO 248 is indistinguishable to the continuous data demodulator 258 from an error in the frequency of the remote carrier synthesizer 212.

The 24 MHz signals 244 and 245 from the VCXO 248 are synthesized from the recovered 1200 Hz clock signal 264 generated by the continuous data demodulator 258. Because the clock signal 111 generated at the base station transmitter 44 has a high accuracy, the 24 MHz signals 244 and 245 at the remote radio 46 also has a high accuracy. Then the frequency error signal 260 generated by the continuous data demodulator 258 is an accurate representation of the carrier frequency synthesizer 212 error, and correcting this error puts the carrier frequency synthesizer 212 accurately on frequency.

Figure 5:
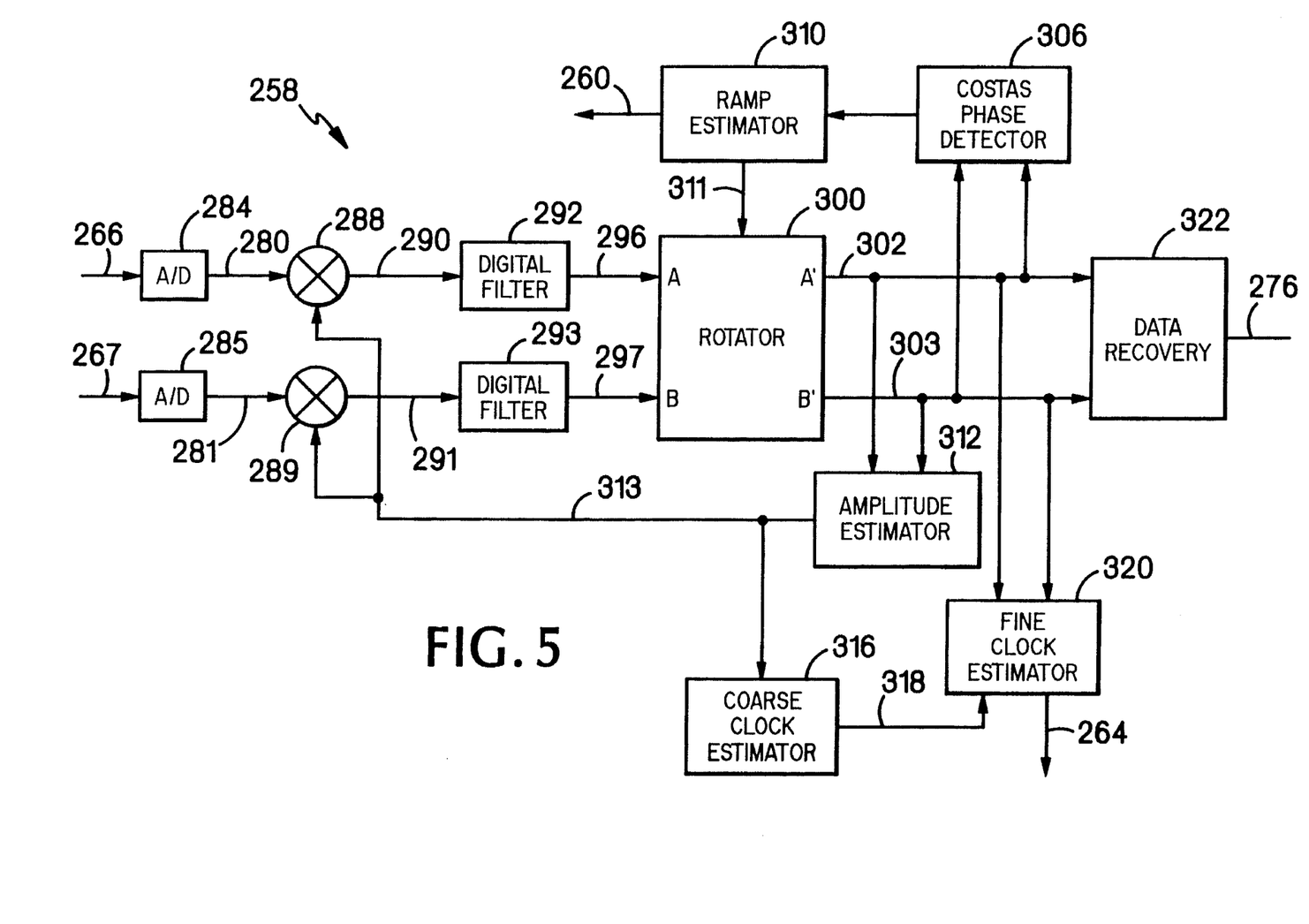
FIG. 5 is a schematic block diagram of the continuous data demodulation circuitry of the remote transceiver.

The continuous data demodulator circuit 258 is shown in detail in FIG. 5. Signals 266 and 267 from analog filters 254 are converted to digital at the two A/D converters 284 and 285, and the resulting digital signals 280 and 281 are scaled by two multipliers 288 and 289 to produce amplified signals 290 and 291. Signals 290 and 291 are digitally filtered at digital filters 292 and 293 to reject out-of-band interference. The filtered signals 296 and 297 are sent to inputs A and B, respectively, of a rotator 300. The rotator 300 determines the amount spurious mixing of in-phase and quadrature components in signals 296 and 297 and reverses this mixing. The outputs A' and B' of the rotator 300 consist of the mixtures:

$$A' = A \cos \phi + B \sin \phi,$$

and $$B' = -A \sin \phi + B \cos \phi,$$

where $\phi$ is the rotation angle. A Costas phase detector 306 determines the amount of quadrature signal in signal 302 (or equivalently, the amount of in-phase signal in signal 303). Ramp estimator 310 generates a phase error signal 311 which controls the amount of rotation $\phi$ performed by the rotator 300 such that signals 302 and 303 become the in-phase and quadrature components, respectively, of the transmission. The ramp estimator also generates the frequency error signal 260 which is directed to the carrier synthesizer 212 (see FIG. 4) to stabilize the carrier frequency 213, but not necessarily to the accuracy of the phase-locking. Rotator 300 accomplishes the effect of phase-locking locally within the continuous data demodulator 258, and can allow the synthesizer control to be relaxed to only accomplish a frequency lock.

The continuous data demodulator 258 utilizes an automatic gain control algorithm to maintain a constant signal level over 24 dB of signal level variations. The amplitude estimator 312 calculates the sum of the squares of signals 302 and 303 from the rotator 300 to generate amplitude estimate 313. The magnitude of the estimate 313 is directed to inverse gain controls of multipliers 288 and 289, thereby stabilizing the amplitude of signals 290 and 291.

A preliminary estimate of the clock phase of signals 302 and 303 is achieved by squaring signal 313 at a coarse clock estimator 316. The output 318 of estimator 316 can be shown to exhibit a peak at the data sample times that have the proper clock phase, and can therefore be used as a coarse estimate of the clock signal 111. A finer estimate of the clock frequency and phase is attained at a fine clock estimator 320 by processing the magnitude of the signals 302 and 303 at the nominal zero crossing times estimated by the coarse clock estimator 316. This generates an error signal 264 which can be used to tune the VCXO 248 thereby putting it accurately on 24 MHz. Since the calculation of the clock phase is independent of the carrier phase and frequency, clock synchronization can be achieved before carrier frequency synchronization is attained. Decoding of signals 302 and 303 is performed at a data recovery circuit 322 to produce recovered data 276. Recovered data 276 is directed to the remote station processor 203 as shown in FIG. 4. The recovered data 276 specifies what information the remote station 46 is to collect from the site units, or transmit to the base station 44.

Figure 8:
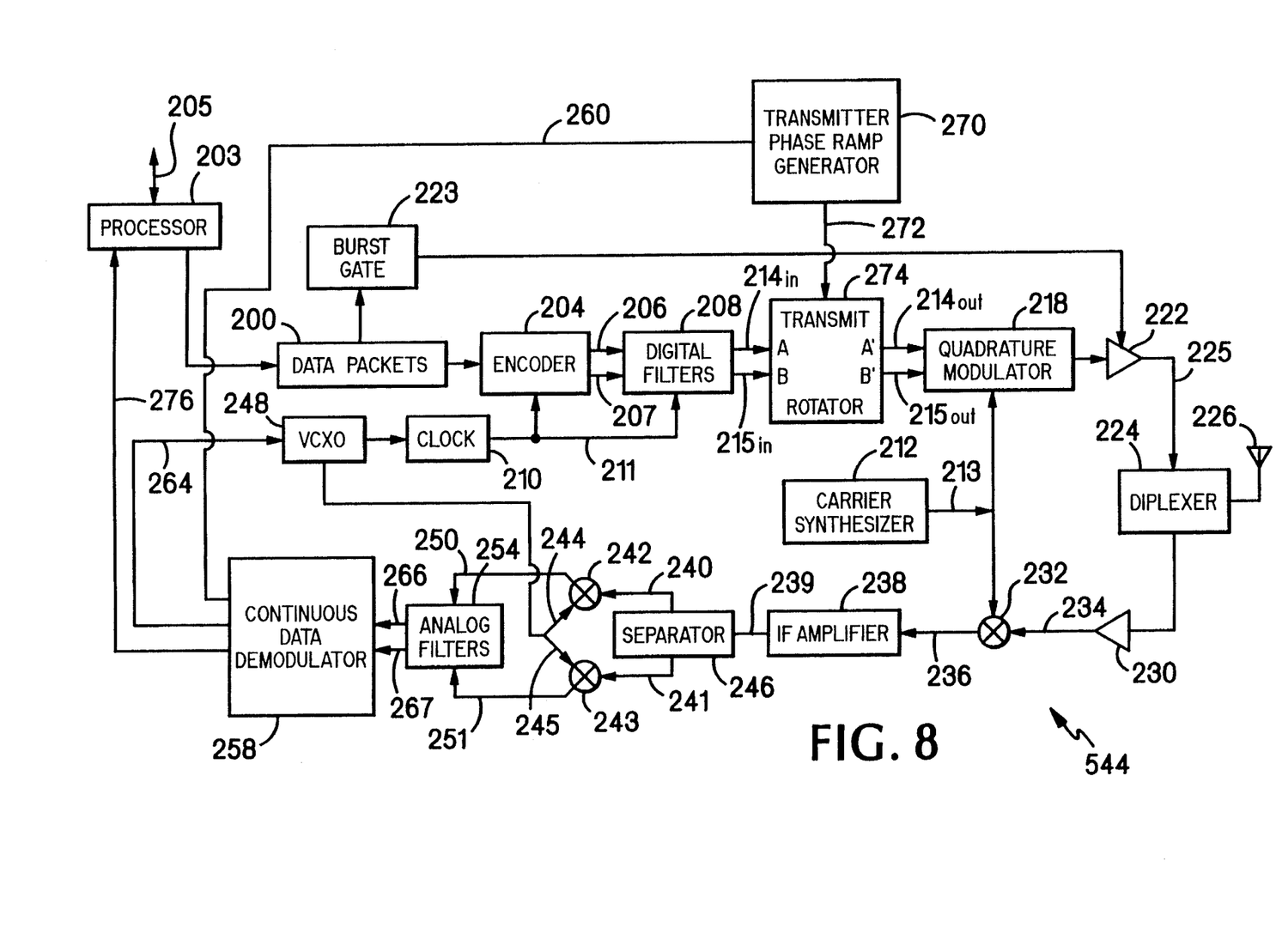
FIG. 8 is a schematic block diagram of a first alternate embodiment of the frequency synchronized bidirectional radio transceiver.

An alternate embodiment of a radio transceiver 544 according to the present invention is provided in FIG. 8. The transceiver 544 works as described in the first preferred embodiment 54 of FIG. 4, except that in this transceiver 544 the frequency error signal 260 is sent to a rotator 274 inserted on the transmission side of the transceiver 544, rather than to the carrier synthesizer 212, to effect phase corrections by adding phase shifts, and frequency corrections by adding continuously increasing or decreasing phase shifts, to the transmitted signal rather than the carrier 213. In particular, this transceiver 544 differs from the transceiver 54 of FIG. 4 in that a transmit rotator 274 is positioned between the digital filters 208 and the quadrature modulator 218. The baseband data signals 214in and 215in input to the transmit rotator 274 are provided by the digital filters 208, and the outputs 214out and 215out from the transmit rotator 274 are directed to the quadrature modulator 218. The amount of rotation $\phi$ produced by the transmit rotator 274 is controlled by a control signal 272 produced by the transmitter phase ramp generator 270 based on the error signal 260 provided by the continuous data demodulator 258 to produce frequency-translated signals 214out A' and 215out B' consisting of the mixtures:

$$A' = A \cos \phi + B \sin \phi,$$

and $$B' = -A \sin \phi + B \cos \phi,$$

where A and B are the baseband inputs 214in and 215in to the transmit rotator 274. By producing a frequency translation of the baseband signals 214in and 215in, the transmission signal 225 has a carrier with an accurate carrier frequency although there is no phase locking or frequency locking in the circuit.

Figure 9:
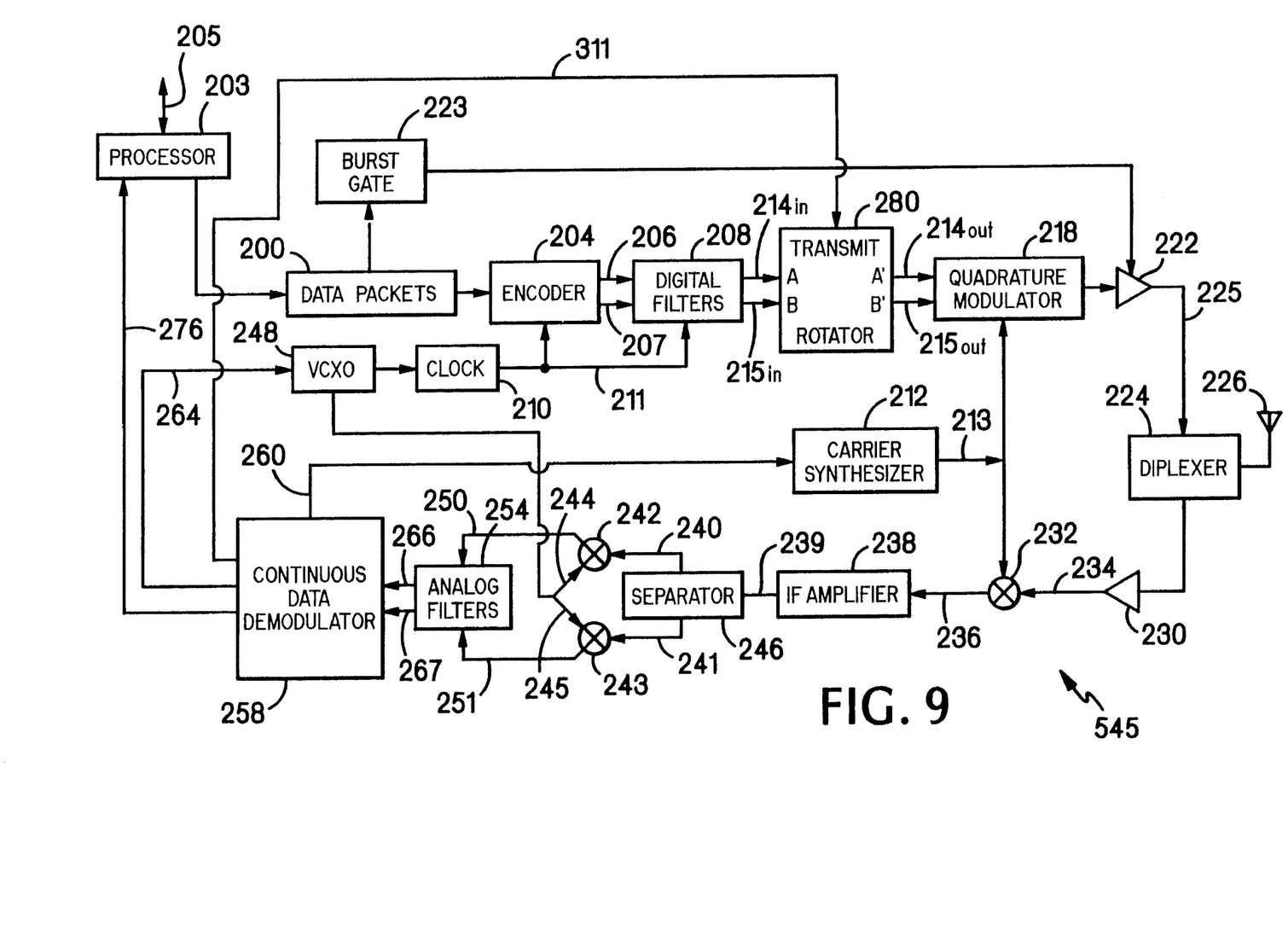
FIG. 9 is a schematic block diagram of a second alternate embodiment of the frequency synchronized bidirectional radio transceiver.

Another alternate embodiment of a radio transceiver 545 according to the present invention is provided in FIG. 9. The transceiver 545 works as described in the first preferred embodiment 54 of FIG. 4, except that this transceiver 545 combines a relatively coarse frequency locking of the carrier synthesizer 212 using error signal 260, with a rotation of the baseband data signals 214in and 215in using a rotator 280 controlled by the control signal 311 from the ramp estimator 310 in the continuous data demodulator 258. (The output of signal 311 from the continuous data demodulator 258 is not shown in FIG. 5.) In particular, this transceiver 545 differs from the transceiver 54 of FIG. 4 in that a transmit rotator 280 is positioned between the digital filters 208 and the quadrature modulator 218. The baseband data signals 214in and 215in input to the transmit rotator 280 are provided by the digital filters 208, and the frequency-translated signals 214out and 215out output from the transmit rotator 280 are directed to the quadrature modulator 218. The amount of rotation φ produced by the transmit rotator 280 is controlled by a control signal 311 produced by the receiver-side ramp generator 310. As before, the frequency-translated signals 214out A' and 215out B' output from the transmit rotator 280 consist of the mixtures:

$$A'=A \cos \phi + B \sin \phi,$$

and $$B'=-A \sin \phi + B \cos \phi,$$

where A and B are the baseband data signals 214in and 215in input to the transmit rotator 280.

In the transceiver 545 of FIG. 9 the frequency of the carrier signal 213 produced by the carrier 212 is corrected whenever a frequency error exceeds a certain frequency threshold amount, whereas the control signal 311 controls the transmit rotator 280 continuously, and only needs to correct for frequency errors up to the frequency threshold amount. In this case the feedback loop which includes the carrier synthesizer 212 and the continuous data demodulator 258 has only a very low bandwidth, and is thus easy and economical to implement. An advantage of this transceiver 545 over the transceiver 544 of FIG. 8, is that only a single phase ramp generator is needed since the ramp estimator 310 on the reception side of the circuit also controls the transmitted signals 214out and 215out.

In another alternate embodiment, the transceiver only functions in half-duplex mode (i.e., transmission and reception cannot occur simultaneously) and the transmission and reception sides of the circuit share the same rotator control signal 311 and rotator 280. During reception the alternate continuous data demodulator 558 shown in FIG. 10 functions as does the continuous data demodulator 258 described above, except that the rotator is now labelled with the reference numeral 280. During transmission the system operates as described in connection with the transceiver 545 of FIG. 9.

Figure 10:
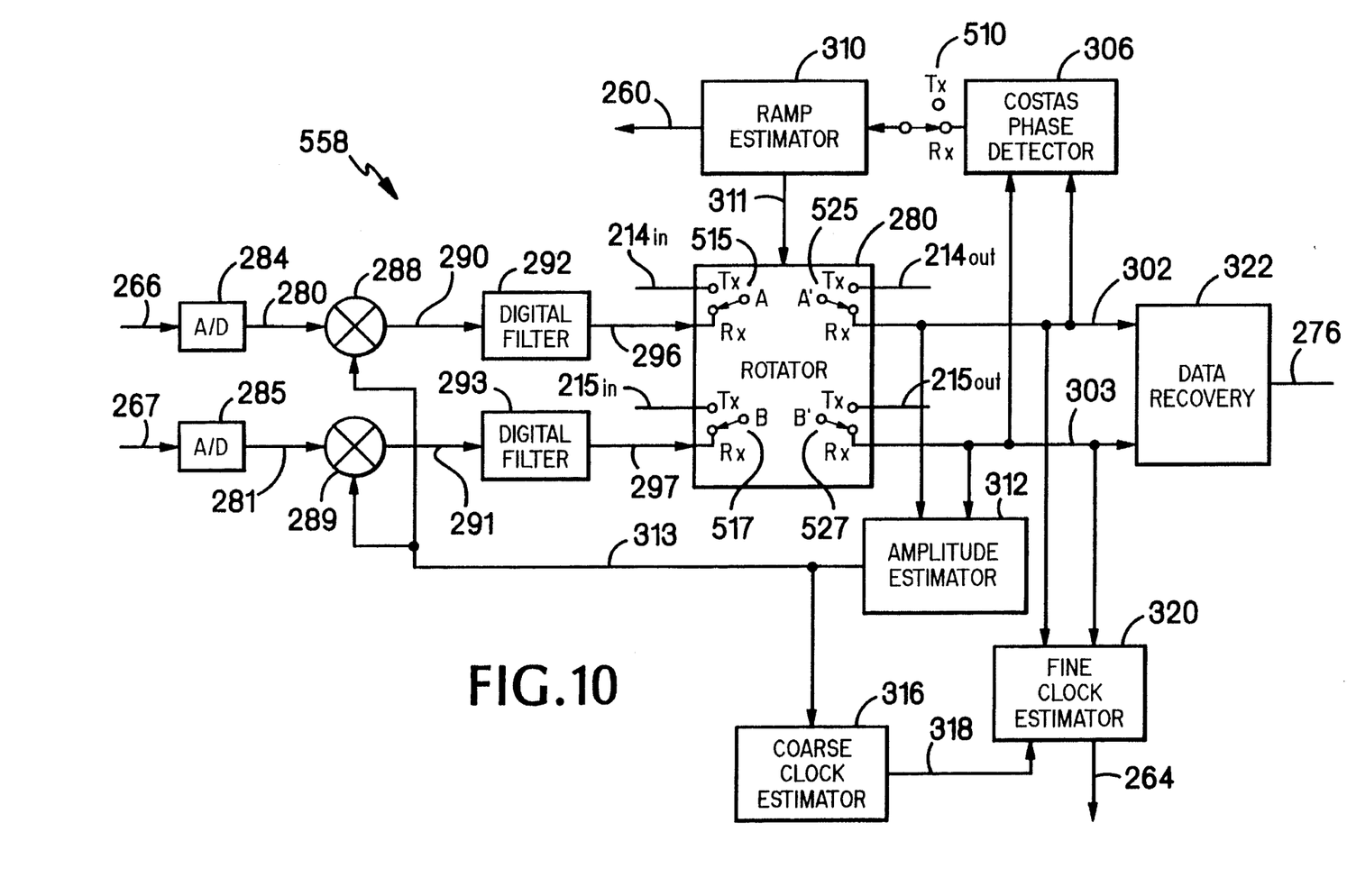
FIG. 10 is a schematic block diagram of an alternate embodiment of the continuous data demodulator where the rotator is switched between the transmission and reception portions of the transceiver circuit of FIG. 9.

The continuous data demodulator 558 of the alternate embodiment is shown in detail in FIG. 10. During reception, switches 510, 515, 517, 525 and 527 are in the Rx positions, and the circuit 558 functions as described above in connection with FIG. 5 since the output of the Costas phase detector 306 is connected to the input of the ramp estimator 310, the A and B inputs of the receive rotator 280 are connected to lines 296 and 297 from the digital filters 292 and 293, and the A' and B' outputs of the receive rotator 280 are connected to lines 302 and 303 to the data recovery circuit 322, the Costas phase detector 306, the amplitude estimator 312 and the fine clock estimator 320. During transmission, switches 510, 515, 517, 525 and 527 are in the Tx positions, and the circuit 558 functions as described above in connection with FIG. 9 since the A and B inputs of the receive rotator 280 are connected to baseband transmission data signals 214in and 215in from the transmit digital filters 208, and the A' and B' outputs of the receive rotator 280 are connected to lines 214out and 215out to the quadrature modulator 218. However, in transmit mode the switch 510 controlling the input to the ramp estimator 310 is open, so the ramp estimator maintains the values of the control signal 311 and carrier error signal 260 used during the previous reception. As was the case in FIG. 9, the feedback loop which includes the carrier synthesizer 212 and the continuous data demodulator 258 has only a very low bandwidth, and is thus easy and economical to implement. With this embodiment of the continuous data demodulator 558 the total hardware costs are minimized since the rotator 280 and ramp estimator 310 are used on both the transmission and reception sides of the transceiver.

In summary, an apparatus for frequency synchronized bidirectional radio system has been described. It will be seen that the embodiment presented herein, consistent with the objects of the invention for a frequency synchronized bidirectional radio system, provide a low-cost high-throughput radio system utilizing frequency domain multiplexing, time domain multiplexing, frequency synchronization and spatial reuse of frequencies. The frequency synchronization of remote stations 46 is provided by extracting the precise clock rate 111 and carrier frequency 113 of the base station 44 and utilizing this information in phase-lock loop circuitry. In an alternate embodiment a burst demodulator continuously updates the decoding threshold based on a comparison of the signal amplitude and the current value of the decoding threshold. In another alternate embodiment, the carrier synthesizer is not part of a phase lock loop, but the transmitted signal is rotated by a phase ramp proportional to a frequency error to provide an accurate carrier frequency. In yet another alternate embodiment only a frequency locking is implemented, and again the transmitted signal is rotated by a phase ramp proportional to a frequency error to provide an accurate carrier frequency. In this alternate embodiment, separate rotators may be used on both the transmission and reception sides of the circuit, or a single rotator may be switched between the transmission and reception sides of the circuit for half-duplex operation.

While the above description contains many specificities, these should not be construed as limitations on the scope of the invention, but rather as exemplifications of preferred embodiments thereof. Many variations are possible. For example: the burst demodulator adaptive threshold unit could be adapted to demodulate an encoded two-state signal where the high state has a signal value above the threshold and the low state has a signal value below the threshold; the burst demodulator adaptive threshold unit could be adapted to demodulate a single encoded three-state signal by simply using only the top half of the circuit of FIG. 7; the burst demodulator adaptive threshold unit could be adapted to demodulate a signal with more than three states by having all thresholds being multiples of a fundamental threshold value, or by independently updating multiple thresholds; there could be separate thresholds for the in-phase and quadrature components; the reduction factors for the in-phase and quadrature components could be different; the multiplication factor R in the burst demodulator adaptive threshold unit could be a value other than 1/32; communications between the system master 40 and the base stations 44 could be by radio communications; more or less than four carriers could be allotted per 12.5 kHz bandwidth; the circuitry of the base station 44 and remote station 46 transceivers could utilize other encoding, filtering and modulation techniques; and the polling formats could take many other forms. The modulation of the carriers 113 and 213 is not necessarily 9QPR, quadrature modulation, or digital modulation, but may be any type of modulation.

The present invention has been described in terms of a preferred embodiment. The invention, however, is not limited to the embodiment depicted and described. Rather, the scope of the invention is defined by the appended claims.

What is claimed is:

1. An apparatus for decoding an encoded analog signal suffering from amplitude modulation to determine discrete output values, said discrete output values including a first nonzero value and a zero value, comprising:

a first means for comparing a first component of said encoded analog signal to a threshold value, if said first component is greater than said threshold value then said first means for comparing sets a first one of said discrete output values equal to said first nonzero value, and if said first component of said encoded analog signal is less than said threshold value then said first means for comparing sets said first one of said discrete output values equal to one of a set of discrete values, said set of discrete values including a zero value; and a first means for modifying said threshold value by adding a first error signal multiplied by a first reduction factor thereto, if said first one of said discrete output values is said zero value then said first means for modifying sets said first error signal equal to zero, and if said first one of said discrete output values is said first nonzero value then said first means for modifying sets said first error signal equal to a difference between said first component of said encoded analog signal and twice said threshold value.

2. The apparatus of claim 1 wherein said set of discrete values includes a second nonzero value equal to a negative of said first nonzero value, if said first component of said encoded analog signal is less than a negative of said threshold value then said first means for comparing sets said first one of said discrete output values equal to said second nonzero value, if said first component of said encoded analog signal is greater than said negative of said threshold value and less than said threshold value then said first means for comparing sets said first one of said discrete output values equal to said zero value, and if said first one of said discrete output values is said second nonzero value then said first means for modifying sets said first error signal equal to a difference between an absolute value of said first component of said encoded analog signal and twice said threshold value.

3. The apparatus of claim 2 further comprising:

a second means for comparing a second component of said encoded analog signal to said threshold value, if said second component is greater than said threshold value then said second means for comparing sets a second one of said discrete output values equal to said first nonzero value, if said second component of said encoded analog signal is less than said negative of said threshold value then said second means for comparing sets said second one of said discrete output values equal to said second nonzero value, and if said second component of said encoded analog signal is greater than said negative of said threshold value and less than said threshold value then said second means for comparing sets said second one of said discrete output values equal to said zero value; and a second means for modifying said threshold value by adding a second error signal multiplied by a second reduction factor thereto, if said second one of said discrete output values is said zero value then said second means for modifying sets said second error signal equal to zero, if said second one of said discrete output values is said first nonzero value then said second means for modifying sets said second error signal equal to a difference between said second component of said encoded analog signal and twice said threshold value, and if said second one of said discrete output values is said second nonzero value then said second means for modifying sets said second error signal equal to a difference between an absolute value of said second component of said encoded analog signal and twice said threshold value.

4. The apparatus of claim 3 wherein said first reduction factor is equal to said second reduction factor.

5. The apparatus of claim 1 further comprising a means for scaling an unscaled signal to provide said encoded analog signal by calculating an amplitude and phase of a reference segment of said unscaled signal to generate a scaling amplitude and a scaling phase, and scaling said amplitude and said phase of said unscaled signal by said scaling amplitude and said scaling phase, respectively.

6. A bidirectional radio communication system comprised of at least one communication cell, said cell having a base station and at least one remote station, said remote station receiving a polling signal at a base clock rate on a base carrier frequency from said base station, said remote station transmitting a response signal carrying a baseband response data signal with a remote clock rate to said base station, said remote station being comprised of:

a first frequency synthesizer generating a remote carrier frequency;

a first frequency heterodyne, said first heterodyne heterodyning said remote carrier frequency and polling signal to generate an intermediate frequency signal;

a second frequency synthesizer generating an intermediate frequency sinusoid, said intermediate frequency sinusoid being stabilized by a first frequency stabilization signal;

a second frequency heterodyne, said second heterodyne heterodyning said intermediate frequency sinusoid and said intermediate frequency signal to generate a received baseband signal;

a first recovery circuit, said first recovery circuit determining a frequency error signal related to a difference between said base carrier frequency and said remote carrier frequency;

a second recovery circuit, said second recovery circuit generating said first frequency stabilization signal and said remote clock rate from said base clock rate;

a rotator for rotating said baseband response data signal by a rate proportional to said frequency error signal to provide a frequency translated signal; and a modulator for modulating said frequency translated signal onto said remote carrier frequency to provide said response signal.

7. The bidirectional radio communication system of claim 6 wherein said first frequency synthesizer utilizes said frequency error signal from said first recovery circuit in a frequency-control loop.

8. A bidirectional radio communication system comprised of at least one communication cell, said cell having a base station and at least one remote station, said remote station operating in half-duplex mode, said remote station receiving a polling signal at a base clock rate on a base carrier frequency from said base station during a reception, said remote station transmitting a response signal carrying a baseband response signal with a remote clock rate to said base station during a transmission, said remote station being comprised of:

- a first frequency synthesizer generating a remote carrier frequency, and utilizing a frequency error signal in a frequency-control loop;
- a first frequency heterodyne, said first heterodyne heterodyning said remote carrier frequency and said polling signal to generate an intermediate frequency signal;
- a second frequency synthesizer generating an intermediate frequency sinusoid, said intermediate frequency sinusoid being stabilized by a first frequency stabilization signal;
- a second frequency heterodyne, said second heterodyne heterodyning said intermediate frequency sinusoid and said intermediate frequency signal to generate a received baseband signal;
- a first recovery circuit, said first recovery circuit including
    a rotator for frequency-translating an input signal at a rotator input to provide a frequency-translated rotator output signal at a rotator output,
    a phase detector for producing a phase detector output proportional to a phase of a phase detector input,
    a ramp estimator for providing a rotator control signal to said rotator and producing said frequency error signal, said frequency error signal being related to a difference between said base carrier frequency and said remote carrier frequency,
    a rotator input switch for directing said received baseband signal to said rotator input during said reception, and directing said baseband response signal to said rotator input during said transmission,
    a rotator output switch for directing said rotator output to said phase detector input and a clock estimator input during said reception, and directing said rotator output to a modulator for modulating said rotator output onto said remote carrier frequency to provide said response signal during said transmission,
    a ramp estimator input switch for connecting said phase detector output to said ramp estimator during said reception, and disconnecting said ramp estimator during said transmission so that said rotator control signal and said frequency error signal are unchanged, and
    a clock estimator for determining an estimate of said base clock rate from said clock estimator input; and
- a second recovery circuit, said second recovery circuit generating said first frequency stabilization signal and said remote clock rate from said estimate of said base clock rate.

* * * * *